(No Model.)

N. PALMER.
PACKING ROCK CANDY FOR SHIPMENT

No. 454,619. Patented June 23, 1891.

WITNESSES:
Otto H. Ehlers
F. P. Davis.

INVENTOR:
Noah Palmer,

BY Chas. B. Mann
ATTORNEY.

UNITED STATES PATENT OFFICE.

NOAH PALMER, OF NEW YORK, N. Y.

PACKING ROCK-CANDY FOR SHIPMENT.

SPECIFICATION forming part of Letters Patent No. 454,619, dated June 23, 1891.

Application filed March 25, 1891. Serial No. 386,320. (No model.)

*To all whom it may concern:*

Be it known that I, NOAH PALMER, a citizen of the United States, residing at New York, in the county of New York and State of New York, have invented certain new and useful Improvements in Packing Rock-Candy for Shipment, of which the following is a specification.

This invention relates to packing and shipping rock-candy. The old way of doing this has been to first remove the candy from the pan in which it has crystallized by taking a long thin-bladed knife and cutting around the candy to loosen the strings extending across the pan and holding the candy. Before this removal could be effected it was necessary to turn the pan upside down and hammer on the bottom. This usually resulted in breaking the "form" in which the rock-candy was made and rendered further attempts to ship it in such form futile. If the form came out whole and perfect, it had to be handled with great care and most carefully packed in shavings or "excelsior." Then in transportation the forms were usually broken, and it was found to be almost impossible to insure perfect safety in this respect.

By my devices I am enabled to ship the candy in its original form without danger of breaking it and with a great saving in time and labor.

Figure 1:
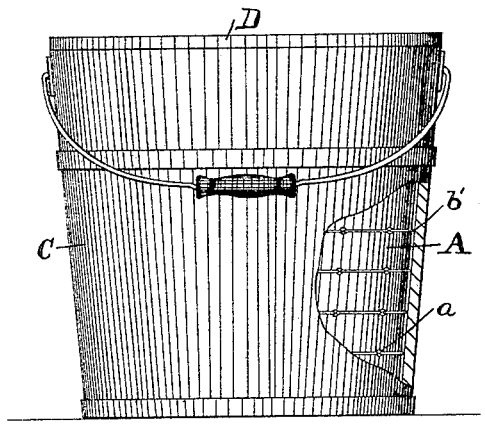
Figure 2:
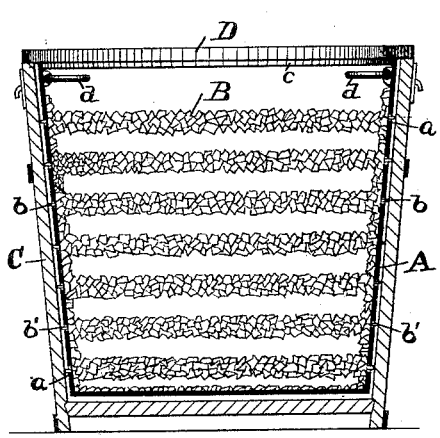

In the accompanying drawings, which illustrate the invention, Figure 1 represents an exterior view of the case in which the candy is shipped, showing a portion of the outside receptacle or pail broken away; Fig. 2, a vertical cross-section through the center of the said case, and Fig. 3 a side elevation of the inside receptacle or candy-pan.

Figure 3:
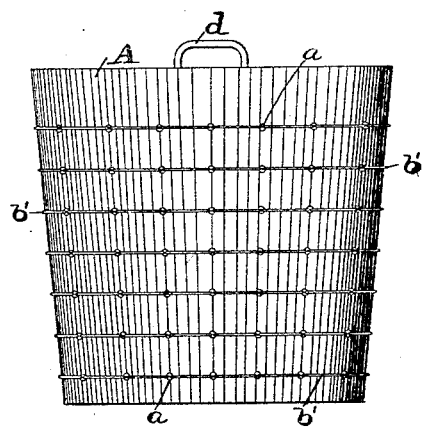

The letter A designates the pan in which the candy is crystallized, which pan is of thin sheet-tin. This pan is conical and its sides taper toward the bottom. They are provided with perforations *a*, and cords *b* are woven through these perforations and across the pan. These cords are passed from one perforation to another on the exterior of the pan and appear as shown in Fig. 3 at *b'*. The pan is filled with prepared sirup in the usual way, and when the crystallization is complete the cords *b* are covered with rock-candy, as shown at B, Fig. 2, and the candy also covers the sides and bottom of the pan. The pan containing this rock-candy form is set in a wooden pail C of the same shape as the pan—*i. e.*, having tapering sides—and the said pan will thus be wedged in the pail with its sides fitting tightly against those of the pail. A round lid or cover D is next fastened over the top of the said pail C and also covers the top of the inside pan A. This cover has an inside annular shoulder *c*, which fits down in the pan and takes against the upper edge or rim thereof to hold it to the sides of the outside pail C. The said shoulder thus serves to prevent the top edge of the candy-pan from being bent in, which would cause the breaking of the candy form.

It will be observed that when packed in this manner the candy is preserved in its original form and thoroughly protected from injury. It is shipped in this shape and will remain intact, and when it reaches its destination it still retains its original form unbroken. This desirable result is mainly due to the inside receptacle or candy-pan fitting tightly or "wedging" in the outside pail, whereby there is no possibility of the said inside pan being dented in.

The preservation of the candy form is rendered certain by reason of the fact that in wedging the candy-pan in the outside pail the cords where they extend, as at *b'*, from one perforation to another on the exterior of the pan are clamped between the pan and pail, and thereby are held securely.

In shipping the candy long distances it will be handled frequently, and if the form is not securely held in place it will loosen from the sides of the pan and the cords will be cut by the edges of the metal at the perforations, and then when the pail is turned upside down in handling during transportation the form will drop against the cover and be broken.

By my method of packing the candy-pan the cords *b'* on the exterior are clamped between the pan and the pail, and said cords cannot stretch and become slack, and consequently the candy form cannot get loose in the pan, and there will be no movement of the form to cause the cords to be cut. It results, therefore, that the candy may be transported without liability of the form being broken.

It will be seen that this method of packing the candy is simple, rapid, and effective in preserving the original form of the candy.

The candy-pan A is provided with hinged handles d, secured on the inside, by means of which it is lifted out of the pail C. These handles are turned down in the pan when the cover D is applied on the pail.

Having thus described my invention, what I claim as new, and desire to secure by Letters Patent, is—

In a shipping-case for rock-candy, the combination of an inside receptacle comprising a conical pan provided with perforations and cords woven across the pan through said perforations with the candy crystallized thereon, an outside receptacle of the same form as said inside receptacle and within which the latter exactly fits and wedges, and a lid secured on said outside receptacle and closing the top of the inside receptacle, said lid having a shoulder c, which fits down in the said inside receptacle and takes against the upper edge or rim of the same.

In testimony whereof I affix my signature in the presence of two witnesses.

NOAH PALMER.

Witnesses:
THOMAS D. BURNHAM,
MARCO I. BLANCH.